US009552734B2

(12) United States Patent
Zlojutro

(10) Patent No.: US 9,552,734 B2
(45) Date of Patent: *Jan. 24, 2017

(54) VEHICLE MONITORING AND IDENTIFICATION SYSTEM

(76) Inventor: Milan Zlojutro, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/641,077

(22) PCT Filed: Apr. 15, 2010

(86) PCT No.: PCT/US2010/001117
§ 371 (c)(1),
(2), (4) Date: Oct. 13, 2012

(87) PCT Pub. No.: WO2011/129800
PCT Pub. Date: Oct. 20, 2011

(65) Prior Publication Data
US 2013/0033386 A1 Feb. 7, 2013

(51) Int. Cl.
G08G 1/123 (2006.01)
G08G 1/00 (2006.01)

(52) U.S. Cl.
CPC ........................................ G08G 1/20 (2013.01)

(58) Field of Classification Search
CPC .................................. G08G 1/123; G08G 1/20
USPC ........................ 340/905, 425.5, 438, 995.13
See application file for complete search history.

(56) References Cited

U.S. PATENT DOCUMENTS

| 7,701,363 | B1* | 4/2010 | Zlojutro | 340/988 |
| 8,022,845 | B2* | 9/2011 | Zlojutro | 340/988 |
| 2004/0004539 | A1* | 1/2004 | Collins | 340/425.5 |
| 2005/0088320 | A1* | 4/2005 | Kovach | 340/933 |
| 2005/0099322 | A1* | 5/2005 | Wainfan et al. | 340/995.13 |
| 2007/0061155 | A1* | 3/2007 | Ji et al. | 705/1 |
| 2008/0045242 | A1* | 2/2008 | Dekock et al. | 455/456.2 |
| 2008/0231470 | A1* | 9/2008 | Ioli | 340/932.2 |
| 2012/0059573 | A1* | 3/2012 | Nortrup | 701/118 |

* cited by examiner

Primary Examiner — Brent Swarthout
(74) Attorney, Agent, or Firm — Paul B. Heynssens Attorney at Law, PLC

(57) ABSTRACT

A vehicle monitoring and traffic enforcement system in which a wireless communication device is associated with motor vehicles The device will transmit vehicle identification data which is relayed to a database which maintains current information concerning insurance law compliance, motor vehicle registration and licensing compliance, traffic citations and other information If a violation or compliance failure is noted, this is transmitted to a law enforcement agency and a nearby law enforcement vehicle A law enforcement officer may be required to pursue the vehicle depending on the violation and traffic conditions The system uses GPS and GIs technology to provide law enforcement with a real time display which will not only show the vehicle being tracked but also a map of the area showing roads, traffic conditions and even the location of other law enforcement or emergency vehicles so that officials may make a safe and fast response to situations.

13 Claims, 3 Drawing Sheets

VEHICLE MONITORING AND IDENTIFICATION SYSTEM

CROSS-REFERENCE IS MADE TO RELATED APPLICATION

Reference is made to U.S. Patent Application Ser. No. 11/655,802, filed Jan. 17, 2007, entitled "Vehicle Tracking And Monitoring System" and issuing as U.S. Pat. No. 7,701,363, Apr. 20, 2010, and U.S. Continuation application Ser. No. 12/760,263, entitled "Vehicle Monitoring and Identification System" filed Apr. 14, 2010, now U.S. Pat. No. 8,022,845,the priority of which is not claimed.

FIELD OF THE INVENTION

The present invention relates to a vehicle monitoring system and more particularly relates to a vehicle and traffic tracking system for monitoring compliance with traffic laws, insurance requirements and motor vehicle registration laws which enables public officials to quickly and safely respond to a violation in an appropriate manner. The system will also provide data concerning traffic patterns and flow which will be of value to urban planners such as engineering and traffic monitoring departments.

BACKGROUND OF THE INVENTION

Many vehicles on the streets, roads and highways are operated in a manner in violation with various laws and regulations. For example, many drivers operate their vehicles in violation of the traffic laws recklessly or at excessive speeds. Various approaches to the motor vehicle law enforcement problem can be found. One common method is observation of roadway traffic by an officer aided by devices which measure motorists' speed. If a motorist is in violation, the officer will pursue the offender and, once the offender is pulled to the roadside, issued a traffic ticket for speed violation. In some instances, the officer is aided by the use of a radar gun which will measure the speed of passing vehicles and, again, if an offense is observed, the motorist may be apprehended and cited. Traffic patrolling requires the physical presence of an officer which may increase the costs to the particular law enforcement agency and will often divert officers from other, perhaps more serious law enforcement activities.

As a result, various automated traffic control systems can be found in use today. For example, photo radar has been adopted by a number of governmental subdivisions. Photo radar is an automated system which is generally set up at one or more locations along the roadside. Sensors detect the speed of passing vehicles and, if an offense is detected, cameras will take photographs of the front and rear of the speeding vehicle. Normally a citation is mailed to the registered owner of the vehicle. Red light compliance is often monitored in a similar manner using sensors and cameras which detect and record violations.

Another concern is that many vehicle operators do not comply with other laws such as insurance laws and motor vehicle registration laws. It has been estimated in some states as many as one third of the motorists are uninsured and as many as 20% of collisions involve uninsured motorists. Thus, uninsured motorists who become involved in collisions impose a substantial financial burden on society. These costs include medical costs, loss of wages incurred by persons injured in such accidents with uninsured motorists along with increased insurance costs to insured motorists who must, in many cases, obtain uninsured motorists coverage at additional costs.

Also, many vehicle operators do not comply with motor vehicle registration and licensing requirements. This illegal operation of a vehicle also imposes additional costs to society and results in loss of revenue to motor vehicle divisions of the various states. Often noncompliance with motor vehicle registration and insurance requirements is not detected until a motorist is stopped for a moving traffic violation and, accordingly, such noncompliance often is not detected. Thus, there exists the need for an effective vehicle monitoring system which would assist in monitoring compliance with traffic laws, insurance requirements and motor vehicle licensing requirements. Such a system would increase revenue to various governmental subdivisions such as the various states. Further, if a system of this type could reduce the number of vehicle operators in violation of such laws, costs to society would be reduced and the number of accidents, injuries and automobile emissions would be reduced. Further, if a system which monitors motor vehicles would increase compliance with these laws, insurance premiums and other related costs to drivers would also be reduced.

BRIEF SUMMARY OF THE INVENTION

In a preferred embodiment, the present invention provides a motor vehicle law enforcement monitoring system which will increase enforcement and reduce violations benefitting society and also generate revenue when a violation occurs. A device is associated with vehicles which a wireless transmission device such as a GPS-enabled cell phone similar to those used in cellular networks which communicates with a centralized or decentralized law enforcement facility. The location of vehicles is tracked by GPS technology and the location is presented on a map using GIS or similar technology. The facility maintains records regarding motor vehicles and operators and, in the event of a noncompliance or a violation such as expired license tags, expired insurance or other traffic citations or violations, will broadcast a signal from the facility to subscribing law enforcement agencies. The records are maintained in a database which receives and maintains information regarding vehicles from sources such as insurance companies, other law enforcement agencies, motor vehicle departments and the like. The location of the vehicle is transmitted along with other information such as the identification of the vehicle and owner which is established by GPS/GIS systems. The information appears on the monitor of a law enforcement officer's vehicle in the area with the location, speed and direction of travel of the vehicle imposed on a map and also may be sent to an area law enforcement facility. The violations may be prioritized and more serious violations may result in pursuit and others will result in a citation being served on the violator. Less serious offenses such as license or insurance issues may only result in a written notice or citation. The computer-equipped law enforcement vehicle may monitor selected geographical areas.

In a preferred embodiment, a device associated with the vehicle is a wireless communication device capable of disclosing the vehicle's location at all times like GPS or similar system such as a Geographical Information System, termed "GIS," may also be used as one of many possible systems in which statutory compliance parameters for registered motor vehicles may be assigned to public roadways. The GPS or similar system will disclose the vehicle's location and behavior. The GIS or similar system discloses a virtual map to compare what the activity/status of the GPS supplied data is with what is in order for the vehicle assigned to that particular GPS signal for compliancy. Deviation beyond a given municipality/governmental subdivision's acceptable variances would trigger an automatic notification to an assigned law enforcement personnel and would automatically update the law enforcement personnel's GPS/GIS system with location, vehicle identification (VID), registered owner's name, as well as any infractions committed, for apprehension of the driver and issuance of a citation. The system is used to identify vehicles operating in noncompliance, as well as to locate the offender for police action.

In another embodiment, the device may be of various other types, such as either a passive or active RFID tag and, when interrogated by an appropriate scanner or activated, will transmit a unique identification indicia related to that vehicle. The data transmitted will be received by a mobile computer, or other communication device such as a cell tower which, in turn, will relay the data to a central database facility. The data relayed to the database will be in the form of a request for information concerning the vehicle, vehicle owner and compliance with various laws. If the vehicle is currently registered, the insurance coverage is current and there is no alert such as a stolen vehicle alert, the database will transmit a notification to this effect. If however, a compliance violation is indicated, this would also be transmitted either directly or indirectly to the police officer. The law enforcement officer, depending upon the nature of the violation, may pursue and apprehend the offender and issue a citation. Alternatively, the police officer can elect not to pursue the offender and the information concerning the violation will be processed and a citation could be issued at a later date and sent by mail or served on the offender.

In another aspect of the system, it may be used to monitor and control parking areas. Overtime parking and parking in restricted zones may be observed.

The system of the present invention would be available to law enforcement agencies and may be on a subscription basis with different types and level of agencies subscribing and electing features and coverage consistent with their legal and geographic responsibility.

BRIEF DESCRIPTION OF THE DRAWINGS

The above and other advantages and objects of the present invention will become more apparent from the following description, claims and drawings in which:

DETAILED DESCRIPTION OF THE DRAWINGS

Figure 1:
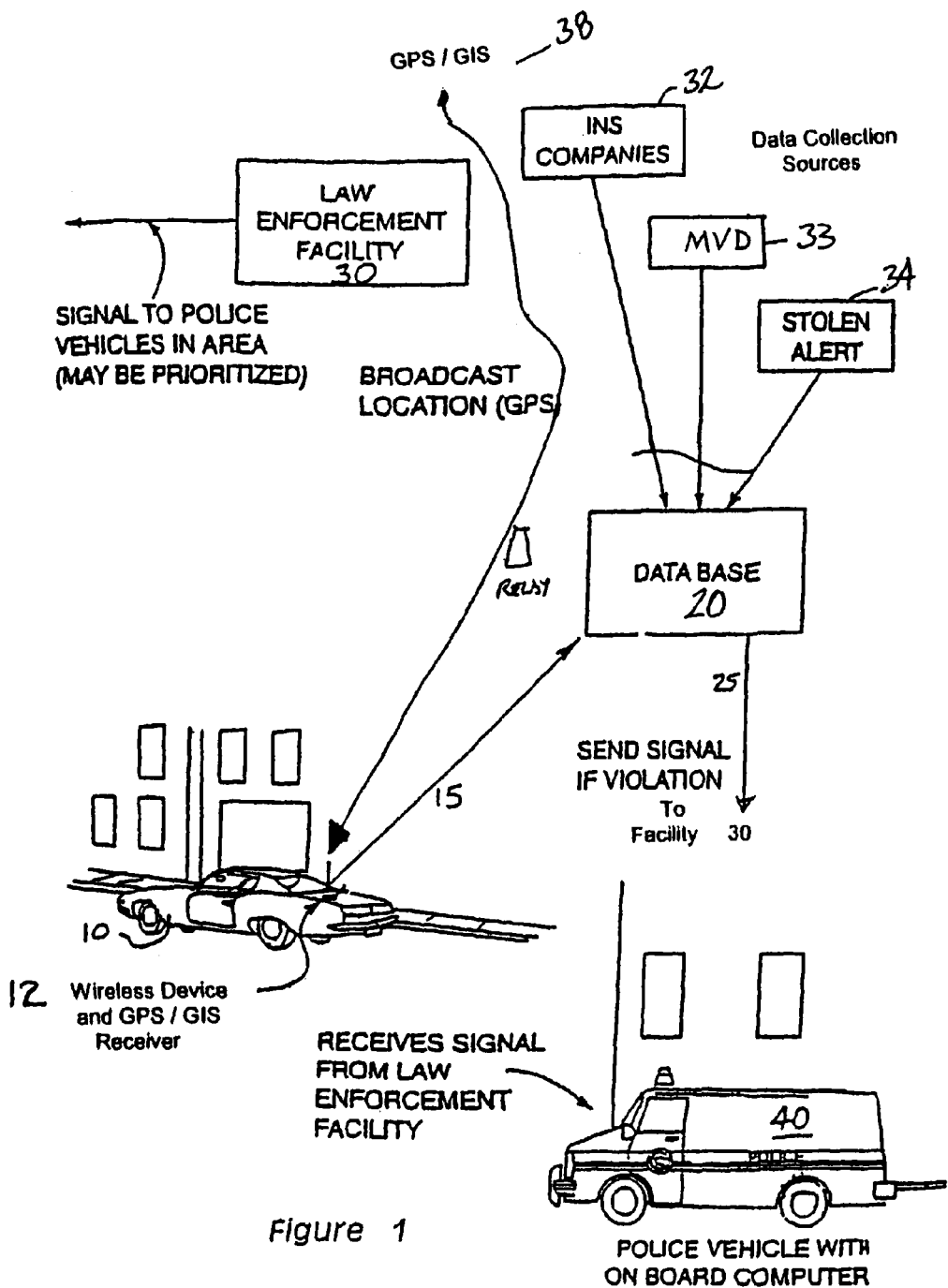
FIG. 1 is a schematic diagram illustrating a preferred embodiment of the vehicle monitoring system of the present invention.

Referring to FIG. 1, a vehicle 10 is shown equipped with a wireless communication device 12 that broadcasts either continuously or intermittently using RF, infrared or other type of signal. The device is preferably embedded in the vehicle structure so as to not be easily removed or inactivated. The device 12 is powered by a power source either directly from the automotive electrical system or a rechargeable battery.

The device is normally in a transmitting mode and will send a wireless transmission identifying the vehicle such as the vehicle identification number (VIN) to a central database 20. The device transmits a discreet, unique signal 15. The database 20 collects relevant data concerning vehicles and vehicle owners from other sources such as information concerning insurance coverage 32, license and registration information 33, stolen vehicle information and outstanding violations, warrants and tickets and alerts such as Amber Alerts are input at 35. If a violation is detected, such as expired insurance, the database 20 will transmit an alert signal 25. The signal 25 is sent to a subscribing law enforcement facility 30 which may then alert one or more patrol vehicles 40 in the area or, alternatively, may issue a citation which is mailed or served on the offender. Preferably the violation is prioritized or coded according to the gravity of the offense.

The device 12 will include GPS and GIS technology 38 so the location of the vehicle 10 is continually monitored and this information is sent either directly to facility 30 or indirectly by being sent to database 20. Devices having circuitry such as or similar to GPS-enabled cell phones will work for this purpose. The location, speed and travel direction of the offending vehicle is broadcast to appropriate law enforcement officers such as patrol vehicles 40 in the area. Speed can be determined by an algorithm using elapsed time and distance traveled by the monitored vehicle. Similarly, erratic and aggressive driving behavior can also be monitored and appropriate action be taken. Generally, the system would be made available to subscribing agencies and a particular agency may elect to monitor a specific area.

Figure 2:
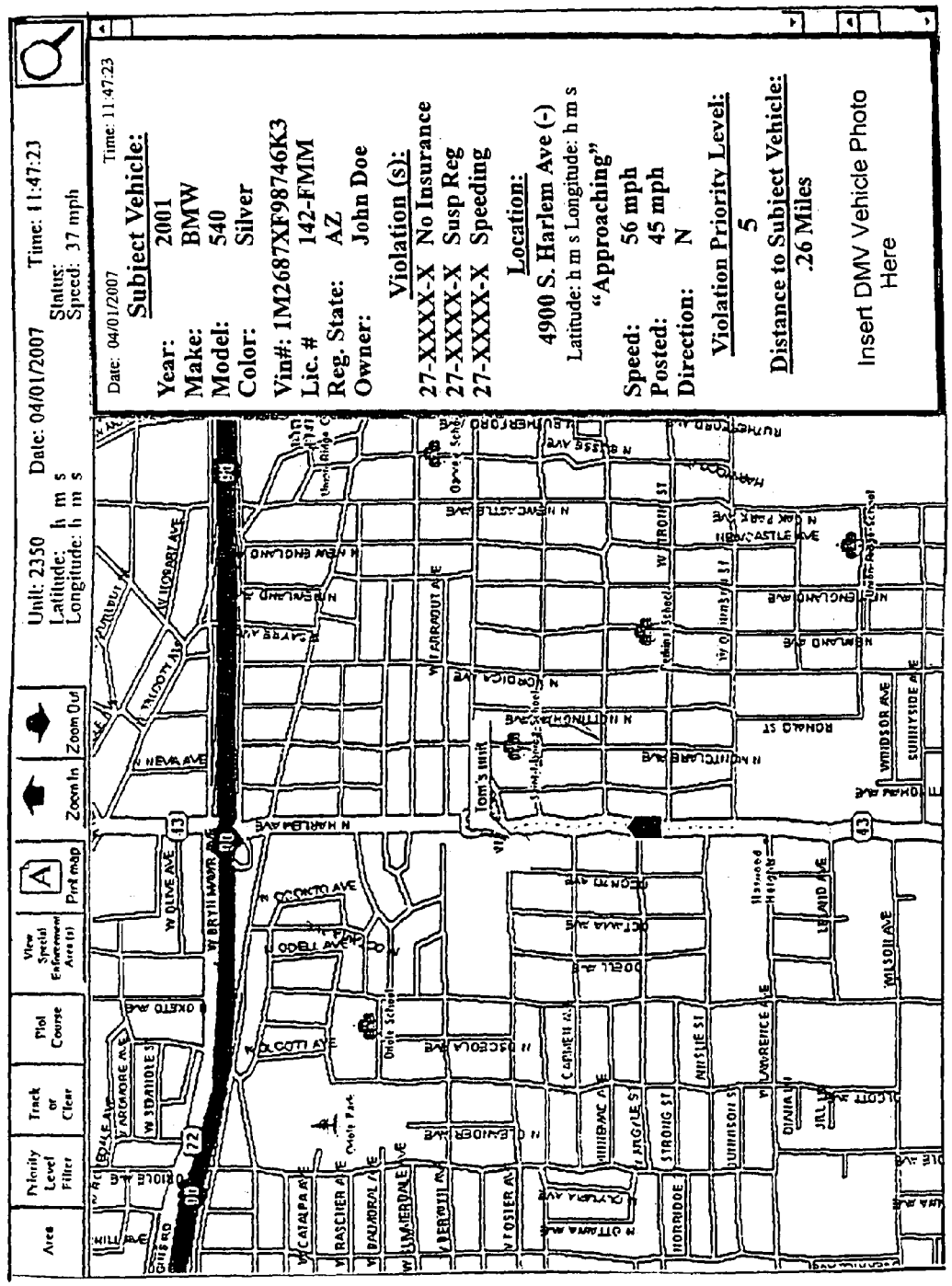
FIG. 2 is a representative monitor display showing the representative information received in a subscribing law enforcement vehicle when a violation occurs.

FIG. 2 shows a representative display that would be displayed on a police vehicle computer monitor 40. The information received by the onboard computer would show a selected geographical area and the location, speed and direction of travel of the vehicle which is being monitored. The display will enable the police officer to determine whether or not to pursue the vehicle and, if so, what routes should be taken. The officer has the ability to zoom in or out to expand or narrow the displayed area. In addition, the information concerning the subject vehicle such as the year of the vehicle, make, model and color is displayed. The identification or VIN is also shown, as well as the vehicle license number. The identity of the owner and the owner's address are also shown. In this instance, several violations have been indicated including no insurance and suspended registration. The nature of the offenses are also graded or prioritized so an officer may quickly determine whether pursuit is appropriate. These may be prioritized on a numerical scale and icons or color coding may also be utilized to indicate the seriousness of the offense. Note in FIG. 2, a priority level filter allows an officer to enter a priority level so that only violations at or above a selected level will be displayed.

Using a GIS-based grid or map, applicable speed limits for streets and highways within the grid divisions are stored and updated. For example, if a street in a grid division has a normal speed limit of 45mph, this may be temporarily reduced to 25 mph if construction is underway. Thus, a vehicle traveling at the normal speed limit would be in violation of the temporary reduced speed limit which would be noted and the violation information relayed to law enforcement officials. The system facilitates continuous updating of information and traffic restrictions such as school zones, construction, road repairs, special events and other conditions affecting speed limits. The officer in vehicle 40 may select to view other similarly equipped law enforcement vehicles in the area and then communicate via computer or radio regarding pursuit.

Figure 3:
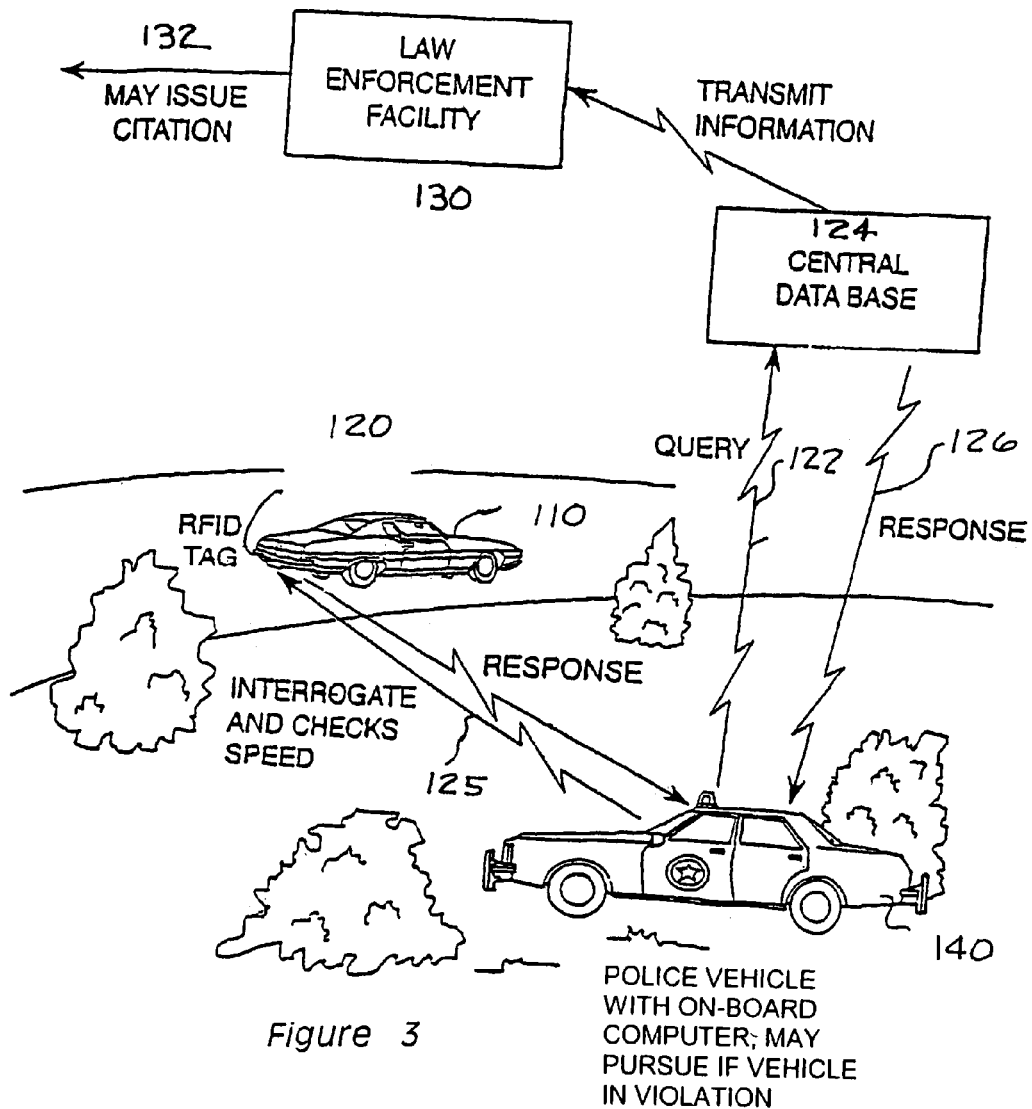
FIG. 3 is a schematic diagram illustrating another embodiment of the vehicle monitoring system utilizing an interrogation system.

Turning now to FIG. 3, another embodiment is shown in which a representative motorist's vehicle 110 is seen traveling along a street. In this embodiment, the system is similar to that described in FIG. 1, but transmits vehicle information upon activation or interrogation. The vehicle is equipped with a device 120 which can be remotely interrogated and will transmit data in response. The device may be an RFID tag with data encoded in the tag's integrated circuit (IC) carrying unique identification indicia particular to that vehicle. The tag may be embedded in the windshield of the vehicle or may be positioned in a secure location in the vehicle. Another alternative is the tag may be located on a license plate, although it is preferred that the tag be positioned so that it cannot easily be located and removed.

RFID tags may be either of the passive or active type. Passive tags have no internal power and a small electrical current is induced in the antenna by the incoming radio frequency signal to power the IC and emits a response which is read by a reader. Active tags have their own power source and are generally more reliable and operate better in harsher environments. Preferably the tag is an active RFID tag which is connected to a power source such as the electrical system of the vehicle. The active RFID tag has greater range, generally several hundred feet or more.

A police vehicle 140 is shown positioned along the roadside. Although the system is particularly adaptable to use in connection with law enforcement vehicles, the tag 120 can be interrogated by a stationary unit positioned at a roadside location which sends an activation signal. The vehicle 140 has an interrogator having a transceiver and a decoder and will scan or interrogate the tag 120 in the passing vehicle. This will cause the tag to transmit data representing the identification of the vehicle. The transmission 125 may be a radio frequency transmission which is received in a nearby cell tower or on an onboard computer in the police vehicle.

Upon receipt of transmission of the unique ID data, the receiver, in turn, will transmit data 122 to a host computer at a central database 124. The information stored in the database is periodically updated with information concerning vehicle ownership, vehicle registration, vehicle insurance, outstanding citations, and any alerts such as stolen vehicle alerts. For example, motor vehicle departments and insurance companies will either periodically or on a schedule (daily) send updated information to the database.

Upon receipt of the data from the interrogated device including the vehicle identification number (VIN), the database will then use the VIN to check for any violations. If no violations or offenses are noted and the vehicle is currently registered and properly insured, the appropriate notification would be transmitted to the police vehicle and no action would be taken.

However, if the status check indicates a violation, such as lack of current insurance coverage or perhaps a more serious offense such as the owner of the vehicle has a number of outstanding warrants, the status report will be relayed to the onboard police computer and to a fixed law enforcement station 130 via signal 128. Upon receipt of the information, the officer will have the option of pursuing the vehicle and issuing a citation or simply storing that information so that a citation 132 can be issued at a later date by either U.S. mail or served upon the registered owner. The decision whether to pursue a vehicle will depend upon traffic conditions and the severity of the violation.

The system may also incorporate provision for detecting a vehicle's speed using a radar or pulsed laser light (LIDAR) in which a signal is reflected so vehicle speed can be computed. Information concerning vehicle speed can be passed to the database along with the vehicle identification information.

Other communication technologies such as WIFI and Bluetooth® may also be used to in implementation of the system. Because of RFID tags and Bluetooth and similar technology often have a limited range, it may be necessary for the VIN data be sent as a result of the interrogation on an intermittent or continuous transmission to be received at a location in close proximity to the subject vehicle. For example, the information could be transmitted to a roadside police vehicle which, in turn, receives the information in the onboard computer and then relays the information to another law enforcement vehicle or to a remote facility for further processing.

Another application of the present invention is to monitor parking violators particularly those that park in both metered and non-metered, time-restricted zones such as area-restricted zones where street parking is limited to 1 or 2 hours and airport loading and unloading zones. Typically parking control officers will mark a parked vehicle by applying a chalk mark to a tire. If the marked vehicle is still in the restricted zone when the officer returns after a time period, the vehicle is ticketed.

With the present invention, the officer can simply scan the vehicle tag which will respond with the vehicle I.D. The officer may have a hand-held unit which is programmed to also note the time of day. The officer will then return at a later time and again scan the vehicles in the area. The hand-held unit using the stored information will then determine if any vehicles previously input into the system remain parked and, if so, compute the time differential. If the differential exceeds the allowed parking period, a ticket is issued. The hand-held unit may also be programmed to issue a citation including the specific code violations, time, vehicle I.D., location and identification of the officer. The ticket is then printed by a printer which may be integral with the hand-held unit.

The combination of GPS/GIS and mapping technology will enable monitoring of parking zones. If a vehicle is parked in a particular zone, the system will maintain current information as to any restrictions in the zone. If a vehicle equipped with a transmission parks in a no-parking area or exceeds the authorized time, the system will note the infraction and the ID of the vehicle and a citation may be issued and sent or served on the offender.

The GPS and GIS available technology is integrated or merged into the vehicle tracking and locating system which will provide law enforcement officers accurate, real-time information concerning violators, emerging conditions and current road and traffic information. A vehicle equipped with the system may also be programmed to receive data, such as a satellite signal, which will alert the driver to changing driving conditions. An onboard cruise control may be programmed to respond to this data and, for example, slow the vehicle in advance of an upcoming road or travel condition.

Geographic information systems can capture and store geographic information. Thus maps, such as FIG. 2, can be continually updated to include information such as road blockages, construction zones, traffic snarls and the like. The system may also be programmed to note applicable information such as speed limits along the roads, streets and highways in a particular zone or area. When a vehicle is monitored and if a speed or similar violation is noted, the violator's location on the display will be noted.

The GPS/GIS technology utilized in the tracking system will also enable officials to monitor stolen or fleeing vehicles and determine pursuit routes and placement of blockage to minimize the danger to the public. The technology will also assist in asset recovery by rental and repossession firms. Emergency vehicles may also be monitored to allow traffic along the vehicle path in advance of the emergency vehicle to be controlled either by a law enforcement officer or by regulating traffic control devices.

Law enforcement and emergency vehicles, as well as other public vehicles, will also be equipped with devices which will transmit identification so they are identifiable on a display monitor. Thus an officer of a subscribing agency can visually determine the location of other vehicles which may render assistance. The transmission is preferably to a central location which, in turn, can relay this information to field locations. Further, the information may be segmented into different levels. For example, at Level 1, the display would show the location of other similar law enforcement vehicles such as marked patrol cars. At Level 2, unmarked cars would be displayed and indicated by a separate distinctive icon or color. Higher levels may extend to vehicles of other agencies such as the F.B.I. or secret service vehicles. Thus, an officer as well as law enforcement administrators monitoring violations would have the tools to quickly make critical decisions and alert and dispatch a response unit.

While the system of the present invention is primarily a law enforcement tool, it also may provide valuable information for land use, traffic, urban and municipal planning. The system will provide valuable demographics for developers and builders. Municipalities will be able to evaluate traffic flows and patterns more efficiently and for safety allocate both human and physical resources. The information sent to the central database concerning vehicle travel can be stored, analyzed and used for these purposes. A system operator may make the information to both the private and public sectors available on a fee basis thus generating income to assist in deferring the costs of the system. Fleet operators may take advantage of the system to monitor both the driving habits of drivers and locations of vehicles.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A method for monitoring vehicular traffic and obtaining information relative to vehicular traffic comprising:
   transmitting, through a communication device, information concerning a selected vehicle including identification of the vehicle and location of the same;
   communicating the information to selected recipients on a communication receiving device;
   receiving a communication concerning a selected vehicle in a processor with a database which maintains current vehicle records relating to vehicle ownership, vehicle violations and vehicle compliance with motor vehicle laws and regulations to generate reported information regarding the selected vehicle; and
   providing through a receiving device, said reported information to one or more selected law enforcement recipients if a violation has occurred;
   wherein the receiving device displays a virtual map of a geographical area in which the selected vehicle is located, the identification of the vehicle owner, vehicle license number, any violations of record, route and speed of the vehicle's travel;
   wherein the vehicle is parked and located in a restricted parking area and the current time is noted and wherein a transmission from the selected vehicle is subsequently monitored to determine if a parking violation has occurred; and
   wherein the reported information includes notification of a violation or noncompliance and wherein the communication prioritizes the reported information based on the nature of the violation or noncompliance.

2. The method for monitoring vehicular traffic of claim 1 wherein the communication device is a wireless device.

3. The method for monitoring vehicular traffic of claim 2 wherein the wireless communication device utilizes technology selected from the group consisting of cellular, GPS, GIS, RFID or other wireless technology.

4. The method for monitoring vehicular traffic of claim 1, wherein the RFID communications device may be either a RFID TAG of the passive or active type.

5. The method for monitoring vehicular traffic of claim 1 wherein the information is transmitted via an intermediate relay.

6. The method for monitoring vehicular traffic of claim 1 wherein the reported information is provided to subscribing or eligible recipients through an alert signal including a notification of a law violation or noncompliance sent by a wireless communication device consisting of cellular, GPS, GIS, RFID.

7. The method for monitoring vehicular traffic of claim 1, wherein the RFID communications device may be either a RFID TAG of the passive or active type.

8. A method for monitoring vehicular traffic and obtaining information relative to vehicular traffic comprising:
   transmitting, through a communication device, information concerning a selected vehicle including identification of the vehicle and location of the same;
   communicating the information to selected recipients on a communication receiving device;
   receiving a communication concerning a selected vehicle in a processor with a database which maintains current vehicle records relating to vehicle ownership, vehicle violations and vehicle compliance with motor vehicle laws and regulations to generate reported information regarding the selected vehicle; and
   providing through a receiving device, said reported information to one or more selected law enforcement recipients if a violation has occurred;
   wherein the receiving device displays a virtual map of a geographical area in which the selected vehicle is located, the identification of the vehicle owner, vehicle license number, any violations of record, route and speed of the vehicle's travel; and
   wherein the reported information includes notification of a violation or noncompliance and wherein the communication prioritizes the reported information based on the nature of the violation or noncompliance.

9. The method for monitoring vehicular traffic of claim 8 wherein the communication device is a wireless device.

10. The method for monitoring vehicular traffic of claim 9 wherein the wireless communication device utilizes technology selected from the group consisting of cellular, GPS, GIS, RFID or other wireless technology.

11. The method for monitoring vehicular traffic of claim 8, wherein the RFID communications device may be either a RFID TAG of the passive or active type.

12. The method for monitoring vehicular traffic of claim 8 wherein the information is transmitted via an intermediate relay.

13. The method for monitoring vehicular traffic of claim 8 wherein the reported information is provided to subscribing or eligible recipients through an alert signal including a notification of a law violation or noncompliance sent by a wireless communication device consisting of cellular, GPS, GIS, RFID.

\* \* \* \* \*